April 12, 1938. O. A. KAPARIN 2,113,888
COASTERS, SERVING AS SUPPORT FOR GLASSES, AND THE LIKE
Filed Nov. 3, 1937
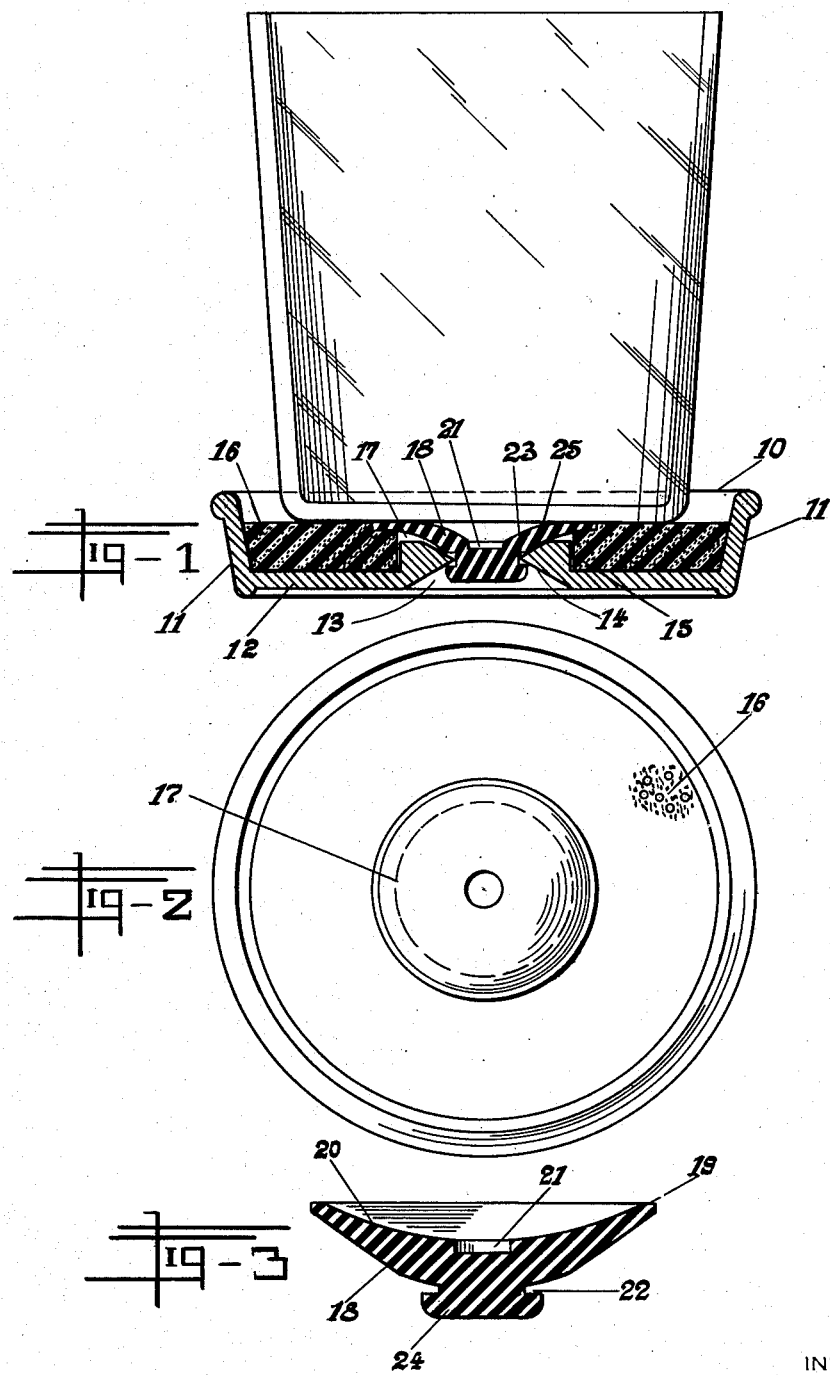
INVENTOR
Otto A Kaparin
BY
Peter M. Boesen
ATTORNEY Patented Apr. 12, 1938

2,113,888

UNITED STATES PATENT OFFICE 2,113,888

COASTER, SERVING AS SUPPORT FOR GLASSES, AND THE LIKE

Otto A. Kaparin, Garfield, N. J.

Application November 3, 1937, Serial No. 172,521

3 Claims. (Cl. 65—53)

This invention relates to new and useful improvements in supports for glasses, and the like, of the kinds generally termed coasters, and it has for its object to provide a coaster, which will adhere to a glass, when this is lifted from a table, and will at all times prevent any moisture and drippings from the glass from touching the table upon which the glass is placed.

As the construction of my device is comparatively simple, the cost of manufacturing the same should be proportionately low.

With the above and other objects in view, this invention consists of the novel features of construction, combination and arrangement of parts, hereinafter fully described, claimed and illustrated in the accompanying drawing, forming part of this application, and in which similar characters of reference indicate corresponding parts in all views, and in which:—

Figure 1 is a vertical transverse sectional view of my device, with a glass placed thereon; while Figure 2 is a top plan view of my said invention.

Figure 3 is a vertical sectional view of a rubber member forming part of my invention.

Referring more particularly to the drawing, 10 indicates a receptacle, or coaster, which has upwardly projecting sides, or flanges 11, and a bottom 12, formed integral. The bottom is made with a central opening 13 therein, as the sides of said opening are obliquely shaped beneath the bottom, as shown at 14. Upon the inner, or upper side of the said bottom the latter is provided with an upwardly extending small rim 15 surrounding the opening 13.

A disk member 16 formed with an opening 17 in the center thereof, is placed upon the bottom of said receptacle, as said opening 17 in the member 16 fits around the rim 15. Said disk member 16 consists of a sponge-rubber, cloth, or any suitable porous material having an absorbent characteristic.

A rubber, or suction, member 18 of the kind commonly known, is inserted through the center opening 13 of the receptacle. Said rubber member is made of a thin pliable material of a kind especially suitable to create a partial, effective vacuum, when an object is pressed against it.

Said member 18 has a top portion 19 formed with a slightly downwardly curved surface 20, which latter has a small depression 21 in its center for the purpose of increasing the vacuum. The lower part of said member 18 has a neck portion 22 adapted to be engaged by an annular edge 23 formed at the bottom of the rim portion 15, as the inner surface of the latter is tapered downwardly to meet the upwardly slanting sides 14 surrounding the opening 13.

The member 18 is inserted in the opening 13 by a turning and pressing movement, and is afterwards held in position by the enlarged portion 24 upon the rubber member 18, which portion engages the lower slanting sides of the opening 13, once the said rubber member 18 is placed therein.

It will be obvious that when a glass, or the like, is placed upon the coaster hereinbefore described, said coaster will adhere to the glass, while the latter is in use, while at the same time no moisture will be able to touch the table upon which the coaster with the glass rests, as the sponge-rubber disk 16 will absorb any such moisture, and even if there should be a surplus of moisture and a small amount of liquid, the latter will normally be prevented from reaching the table on account of the outer flanges 11 and the flanges of the rim 15 around the opening 13, as furthermore the rubber member 18 overlaps the said rim 15, thereby securely confining said moisture and liquid within the receptacle 10.

It is obvious that changes may be made in the form, construction and arrangement of the several parts, as shown, within the scope of the appended claims, without departing from the spirit of the invention, and I do not therefore wish to limit myself to the exact construction and arrangement shown and described herein.

What I claim as new, and desire to secure by Letters Patent of the United States, is:—

Claims:

1. In a device of the class described, a receptacle having a bottom portion surrounded by a low flange, said bottom portion being formed with an opening in the center thereof, a rim surrounding said opening, the inner wall of said rim being formed with a downwardly slanting surface, and the edge surrounding the opening in the bottom portion being formed with a slanting surface narrowing towards said opening, whereby to provide a narrow thin edge portion as the surrounding wall of said opening, an absorbent member formed with an opening in the center thereof and being placed on top of the bottom of the receptacle, a rubber suction member mounted in the center opening of the receptacle, said suction member being formed with a neck portion adapted to be engaged by the narrow thin edge of the center opening, and an enlarged depending portion upon said rubber suction member, whereby to secure the latter to the bottom of the receptacle, the sides of the top of the rubber suction member being adapted to overlap the side of the rim, substantially as and for the purpose set forth.

2. In a device, as claimed in claim 1, and in which the rubber suction member is formed with a central annular depression therein, whereby to increase the adhesiveness of said member.

3. In a device of the class described, a receptacle having a bottom portion surrounded by a low flange, said bottom portion being formed with an opening in the center thereof, a rim surrounding said opening, the inner wall of said rim being formed with a downwardly slanting surface, and the edge surrounding the opening in the bottom portion being formed with a slanting surface narrowing towards said opening, whereby to provide a narrow thin edge portion as the surrounding wall of said opening, an absorbent member formed with an opening in the center thereof and being placed on top of the bottom of the receptacle, a rubber suction member mounted in the center opening of the receptacle, said suction member being formed with a neck portion adapted to be engaged by the narrow thin edge of the center opening, and an enlarged depending portion upon said rubber suction member, whereby to secure the latter to the bottom of the receptacle.

OTTO A. KAPARIN.